(12) United States Patent
Chen et al.

(10) Patent No.: US 12,537,594 B2
(45) Date of Patent: Jan. 27, 2026

(54) SATELLITE PATH CALIBRATION

(71) Applicant: Hughes Network Systems, LLC, Germantown, MD (US)

(72) Inventors: Bin Chen, Germantown, MD (US); James Jehong Jong, North Potomac, MD (US); Mostafa Tarrah, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 330 days.

(21) Appl. No.: 18/318,902

(22) Filed: May 17, 2023

(65) Prior Publication Data
US 2024/0048231 A1    Feb. 8, 2024

Related U.S. Application Data

(60) Provisional application No. 63/370,083, filed on Aug. 1, 2022.

(51) Int. Cl.
*H04B 7/185*    (2006.01)

(52) U.S. Cl.
CPC ..... *H04B 7/18519* (2013.01); *H04B 7/18513* (2013.01)

(58) Field of Classification Search
CPC ........ H04B 7/185–195; H04B 7/18519; H04B 7/18513
See application file for complete search history.

(56) References Cited

U.S. PATENT DOCUMENTS

| | | | |
|---|---|---|---|
| 9,642,107 B1* | 5/2017 | Chen | H04L 25/00 |
| 10,284,308 B1 | 5/2019 | Elwailly et al. | |
| 10,432,308 B1 | 10/2019 | Turgeon et al. | |
| 2003/0040274 A1 | 2/2003 | Dai et al. | |
| 2003/0050072 A1 | 3/2003 | Noerpel et al. | |
| 2013/0210424 A1 | 8/2013 | Boustie et al. | |
| 2015/0347102 A1* | 12/2015 | Lattner | G06F 8/443 717/146 |

(Continued)

FOREIGN PATENT DOCUMENTS

| | | |
|---|---|---|
| CN | 112193439 B | 3/2021 |
| FR | 2806556 B1 | 6/2002 |

OTHER PUBLICATIONS

International Search Report for PCT Application No. PCT/US2023/070797.

*Primary Examiner* — Raymond S Dean
(74) *Attorney, Agent, or Firm* — Capitol City TechLaw; Jasbir Singh

(57) ABSTRACT

A method for setting a calibration signal power, the method including: transmitting a calibration-modulated wave (CMW) signal at a frequency slot; receiving a power measurement of the CMW signal; calculating a calibration correction factor for the frequency slot based on the power measurement; and adjusting a transmission power of the CMW signal at the frequency slot based on the calibration correction factor. A method for switching over a control channel and a voice channel from an old sub-band to a new-sub-band, the method including: switching over control channel and voice channel among multiple GW components and satellite payload; predicting switchover time to reduce control channel and voice channel outage time during switchover.

20 Claims, 3 Drawing Sheets

(56) References Cited

U.S. PATENT DOCUMENTS

| | | | | |
|---|---|---|---|---|
| 2019/0173545 A1* | 6/2019 | Grybos | ................... | H04B 1/69 |
| 2020/0287620 A1* | 9/2020 | Oster | ..................... | H01Q 3/267 |
| 2021/0341623 A1* | 11/2021 | Esterhuizen | ............ | H01P 5/187 |
| 2021/0364848 A1* | 11/2021 | Chen | ................... | G02F 1/13398 |

* cited by examiner

SATELLITE PATH CALIBRATION

CROSS-REFERENCE TO RELATED APPLICATIONS AND INCORPORATION BY REFERENCE

The present application claims the benefit under 35 U.S.C. 119(e) of U.S. Provisional Application Ser. No. 63/370,083, filed Aug. 1, 2022, which is incorporated herein by reference in its entirety.

FIELD

The present teachings disclose a system and method for satellite path calibration including gateway equipment calibration (short loop calibration) and spacecraft calibration (long loop calibration).

BACKGROUND

In a High Throughput satellite (HTS) system, maintaining uniform power levels of control channels across all the beams is needed for proper beam selection by a User Terminal (UT). The beams can include a feeder link or a mobile link. A feeder link is a link between a gateway (GW) and a satellite. A mobile link is a link between a UT and a satellite.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Terminals rely on a received control carrier power level for beam selection. A satellite needs to maintain a constant transmit power level across service link beams and over the service link band, for example, the L band. Moreover, a link between a gateway and a satellite (i.e., feeder link) may experience signal fluctuation across frequency over time.

Accurate calibration based on carrier level calibration power measurement results provided by a satellite provide for robust beam selection by a UT. The present calibration teachings minimize BCCH and voice outage due to satellite limitation of routing two sub-bands on a single FS. Error handling when switching sub beams for calibration is also disclosed.

In some aspects, the techniques described herein relate to a method for setting a calibration signal power, the method including: transmitting a calibration-modulated wave (CMW) signal at a frequency slot; receiving a power measurement of the CMW signal; calculating a calibration correction factor for the frequency slot based on the power measurement; and adjusting a transmission power of the CMW signal at the frequency slot based on the calibration correction factor.

In some aspects, the techniques described herein relate to a method, further including filtering the CMW signal with a root raised cosine filter prior to the transmitting.

In some aspects, the techniques described herein relate to a method, further including validating the power measurement prior to the adjusting.

In some aspects, the techniques described herein relate to a method, wherein the receiving includes receiving the power measurement from a satellite.

In some aspects, the techniques described herein relate to a method, further including performing the power measurement of the CMW signal upon reception at a satellite; and sending the power measurement from the satellite to effectuate the receiving.

In some aspects, the techniques described herein relate to a method, wherein the calculating of the calibration correction factor is based on a power difference between a target power and the power measurement of the frequency slot.

In some aspects, the techniques described herein relate to a method, further including performing a short loop calibration on a sub-band of the frequency slot.

In some aspects, the techniques described herein relate to a method, wherein the frequency slot includes frequency bins and the power measurement includes power measurements for each of the frequency bins.

In some aspects, the techniques described herein relate to a method, wherein the calculating includes calculating a respective calibration correction factor for each of the frequency bins as a power difference between a target power and a respective measured power of a respective frequency bin.

In some aspects, the techniques described herein relate to a method, wherein, for each of the frequency bins, the adjusting adjusts a respective transmission power based on a respective calibration correction factor.

In some aspects, the techniques described herein relate to a method, further including validating, for each of the frequency bins, a power correction factor prior to the calculating of a respective power correction factor for a respective frequency bin.

In some aspects, the techniques described herein relate to a method, further including discarding the power measurements when the validating of a respective power measurement for any of the frequency bins indicates an invalid power measurement.

In some aspects, the techniques described herein relate to a method, further including transmitting a control or voice channel at the frequency slot at the transmission power; and switching over the control or voice channel at a gateway from an old sub-band to a new sub-band at the frequency slot transmitting at the measured power.

In some aspects, the techniques described herein relate to a method, further including predicting a switchover time from the old sub-band to the new sub-band to improve a control or voice channel break.

In some aspects, the techniques described herein relate to a method, further including tracking the sub-band assignment, wherein the switching over switches back to the old sub-band when a switchover to the new sub-band fails.

In some aspects, the techniques described herein relate to a method, wherein the CMW signal is a continuous signal.

In some aspects, the techniques described herein relate to a method, wherein the CMW signal is used for setting the transmission power for a Broadcast Common Control Channel.

In some aspects, the techniques described herein relate to a system to set a calibration signal power, the system including: a root raised cosine filter to filter a CMW signal; a transmitter to transmit a calibration-modulated wave (CMW) signal at a frequency slot including frequency bins; a receiver to receive a power measurement of the CMW signal; a Global Resource Management (GRM) to calculate a calibration correction factor for each of the frequency bis of the frequency slot based on the power measurement; and a Traffic Control Subsystem (TCS) to adjust a transmission power of the CMW signal at each of the frequency bins of the frequency slot based on a respective calibration correction factor, wherein the CMW signal is used for setting a transmission power for a Broadcast Common Control Channel.

In some aspects, the techniques described herein relate to a system, further including a satellite to perform a respective power measurement of each of the frequency bins of the CMW signal at the satellite upon reception, and to send each of the respective power measurements as the power measurement to the receiver.

In some aspects, the techniques described herein relate to a system, wherein the GRM calculates the calibration correction factor based on a power difference between a respective target power and a respective power measurement of each of the frequency bins of the frequency slot.

Additional features will be set forth in the description that follows, and in part will be apparent from the description, or may be learned by practice of what is described.

BRIEF DESCRIPTION OF DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1A:
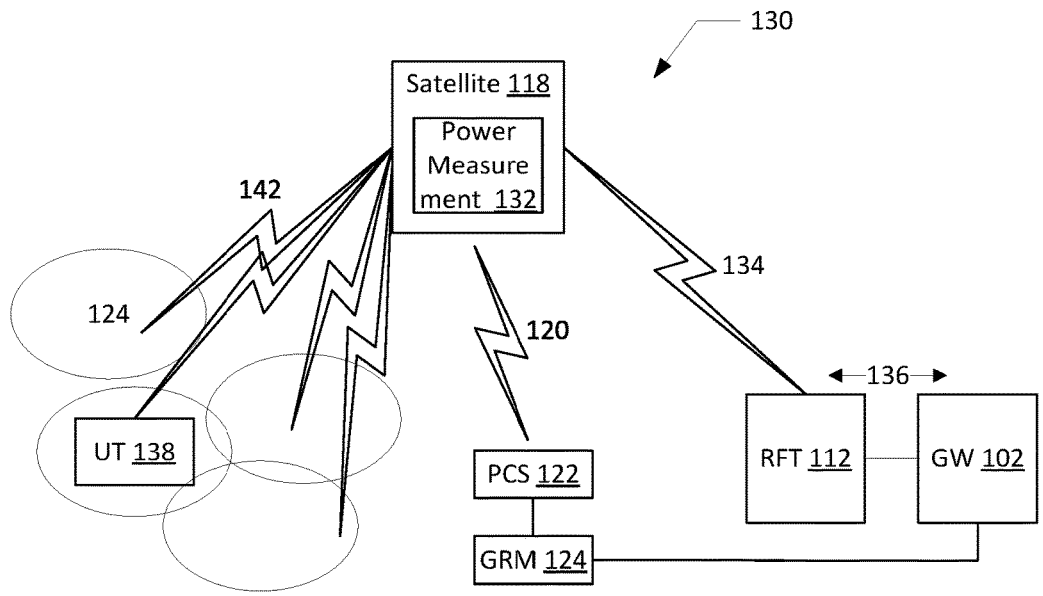
FIG. 1A illustrates a block diagram of a long loop calibration power measurement according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Satellite path calibration includes gateway equipment calibration (short loop calibration) and spacecraft calibration (long loop calibration). The gateway equipment calibration (short loop) aligns channel unit modem carriers to a relative reference and ensures that their respective power levels are within normal operating bounds. The spacecraft calibration (long loop) determines power level calibration factors to correct absolute spacecraft processor output power for gateway transmitted carriers.

The long loop calibration may be performed with a BCCH. The long loop calibration is generally performed after completion of the short loop calibration. The short loop calibration may include gain variation in the gateway modems and corrections to portions of the RFT. The long loop calibration may align a BCCH carrier power level to a known reference power level at the satellite. The alignment includes compensating for a common gain variation due to bias and gain slope between the satellite payload and the RFT. A control channel calibration maintains uniform power levels across beams at the satellite and proper UT beam selection.

A long loop calibration measures a calibration signal power level at satellite payload and adjusts the transmit power levels based on the measurement results. The calibration signal may be a BCCH calibration signal.

FIG. 1A illustrates a block diagram of a satellite system utilizing a long loop calibration power measurement according to various embodiments.

Figure 1B:
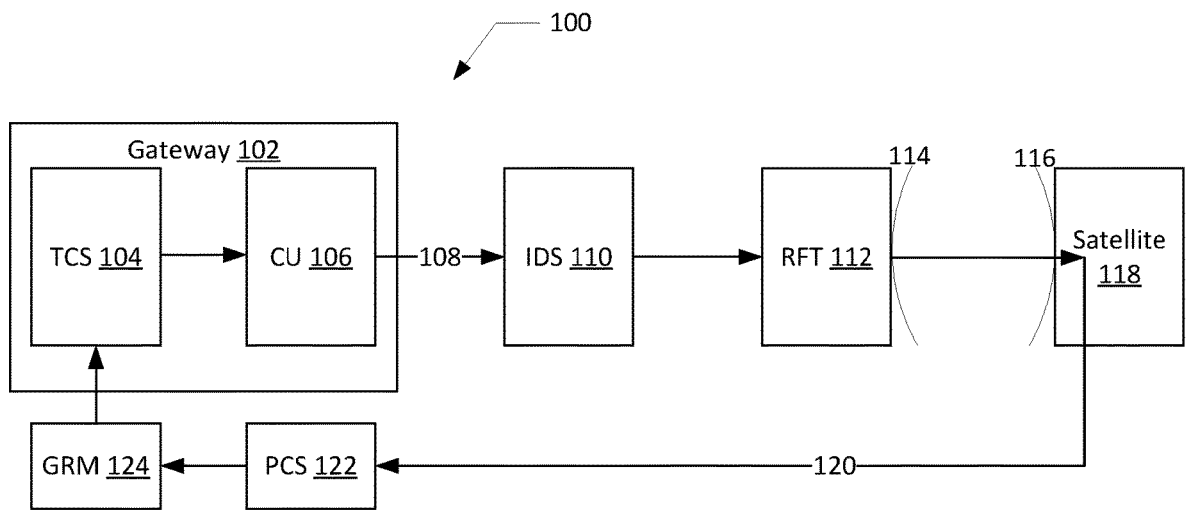
FIG. 1B illustrates a block diagram of a long loop calibration power measurement according to various embodiments.

FIG. 1A illustrates a satellite system 130 including a power measurement module 132 disposed in a satellite 118. The satellite system 130 may connect the RFT 112 and the gateway 102 with a UT 138 disposed within a coverage area 140 of a beam 142. FIG. 1A and FIG. 1B are jointly further described below. The satellite system 130 may utilize a short-loop calibration 136 between the gateway 102 and the RFT 112 and a long loop calibration 134 between the RFT 112 and the satellite 118 to make best use of available signaling power at a satellite while minimizing interference.

FIG. 1B illustrates a block diagram of a long loop calibration power measurement according to various embodiments.

FIG. 1B illustrate a long loop calibration power measurement system 100. The long loop calibration power measurement system 100 may be disposed in a gateway 102. The system 100 may include a CU 106. The CU 106 may transmit a CMW signal 108 for a long loop calibration 134 at a specific frequency from a RFT 112 using an antenna 114, for example, a Ka-band antenna. The CMW signal 108 may be a continuous signal. The power measurement module 132 in the satellite 118 may be used for the long loop calibration 134.

The frequency used for the long loop calibration 134 depends upon the sub-band allocation from a GRM 124. The CMW signal 108 may include four 6-slot bursts in a frame. Each 6-slot burst may be a p/4-CQPSK-modulated with 15-bit pseudo random data at a symbol rate of 23.4 ksps. A satellite 118 measures the CMW signal power at reception at an antenna 116, for example, a Ka-antenna. The satellite 118 sends a power measurement result 120 to the gateway 102 via a PCS 122 and a GRM 124.

The following subsystems are involved in the long loop calibration power measurement system 100. The TCS 104 may schedule BCCH long loop calibration and verify the BCCH calibration power measurement results 120. The CU 106 may transmit the CMW signal 108 used for the calibration power measurement. The IDS 110 may amplify and distribute the CMW signal 108 between the CU 106 and the RFT 112. The RFT 112 may amplify and upconvert the CMW signal 108 to an IF frequency to a Ka-band frequency and transmit the CMW signal 108 to the satellite 118. The satellite 118 may receive and measure the CMW signal 108 and send the power measurement results 120 to the PCS 122. The PCS 122 and the GRM 124 may forward the BCCH calibration power measurement results 120 to the TCS 104.

Let $P_{BCCH\_SB1}$ be a power level of a selected BCCH currently being transmitted by a CU port 1 on SB1. A new CU port 2 may be selected for the BCCH long loop calibration. Let $P_{BCCH\_SB2}$ be the power level of the BCCH calibration signal transmitted in SB2 and $f_{BCCH\_SB2}$ be the BCCH calibration signal frequency in SB2. The CU port 2 may have undergone SLC to generate power correction factors, for example, five power correction factors $\Delta_{SLC}$ ($f_{SLC\_i}$), i=1 to 5, where $f_{SLC\_i}$ represents one of the five calibration frequencies used in the SLC. The initial $P_{BCCH\_SB2}$ may be computed from the $P_{BCCH\_SB1}$ and the power correction factor obtained after the SLC procedure may use the following equation:

$$P_{BCCH\_SB2}(f_{BCCH\_SB2}) = P_{BCCH\_SB1} + \Delta_{SLC}(f_{SLC\_k}) \qquad (1)$$

In (1), $f_{SLC\_k}$ is the nearest SLC calibration frequency from the BCCH calibration signal frequency $f_{BCCH\_SB2}$.

In some embodiments, a calibration signal has the frequency bandwidth of 31.25 kHz and is pulse shaped before transmission. The pulse shaping filter is the root raised cosine filter with a roll-off factor of $\alpha$ ($\alpha$=0.35). Its frequency response H(f) is defined by equation (2), where the symbol period T is defined as 1/23400 seconds.

$$|H(f)| = \begin{cases} 1 & \text{for } 0 < |f| < \frac{(1-\alpha)}{2T} \\ \sqrt{\frac{1}{2}\left\{1 - \sin\left[\frac{\pi(2|f|T-1)}{2\alpha}\right]\right\}} & \text{for } \frac{(1-\alpha)}{2T} \leq |f| \leq \frac{(1+\alpha)}{2T} \\ 0 & \text{for } |f| > \frac{(1+\alpha)}{2T} \end{cases} \qquad (2)$$

Figure 2:
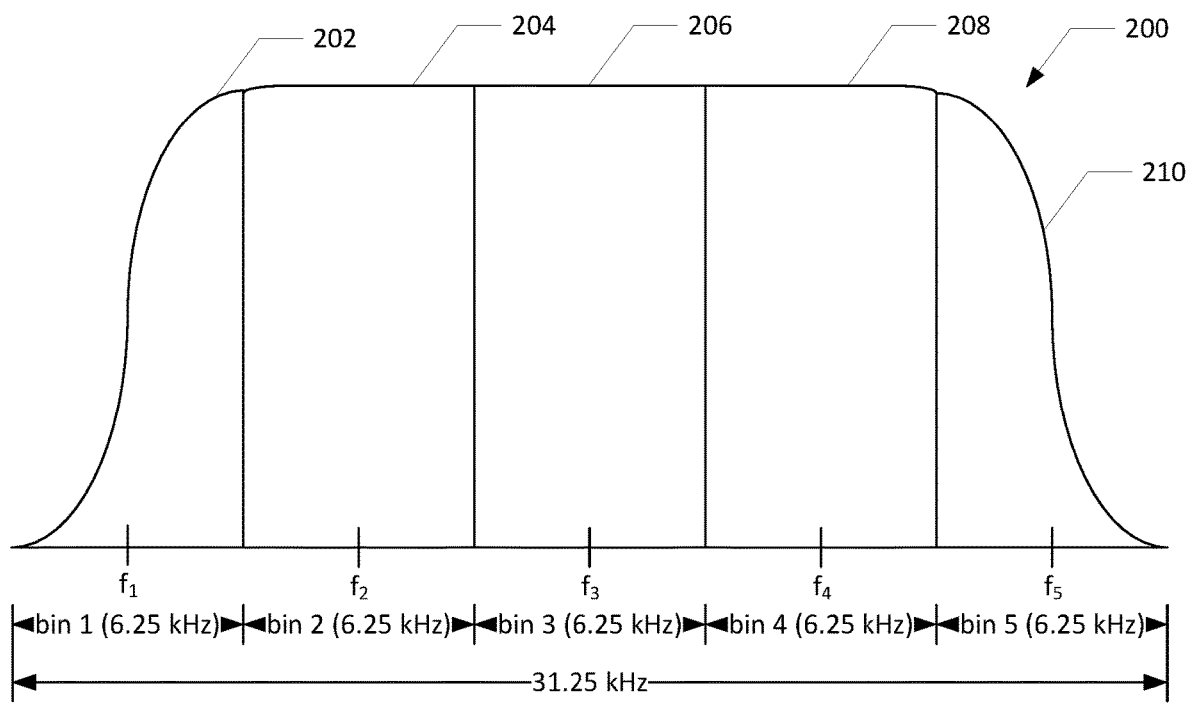
FIG. 2 illustrates a calibration signal according to various embodiments.

FIG. 2 illustrates a calibration signal according to various embodiments.

The satellite payload is configured to measure a calibration signal 200, for example, a BCCH calibration signal. The measurement may be across frequency bins 202, 204, 206, 208, 210, for example, five 6.25 kHz frequency bins of a 31.25 kHz signal. After the measurement is done, the satellite payload sends the five power measurement results corresponding to the frequency bins 202, 204, 206, 208, 210 to the GRM. In the example, center frequencies of the frequency bins 202, 204, 206, 208, 210 are given as: $f_1 = f_{CMW} - 12.5$ kHz; $f_2 = f_{CMW} - 6.25$ kHz; $f_3 = f_{CMW}$; $f_4 = f_{CMW} + 6.25$ kHz; and $f_5 = f_{CMW} + 12.5$ kHz, where $f_{CMW}$ is the center frequency of a respective 31.25 kHz BCCH calibration signal.

The GRM may generate five power correction factors ($\Delta_{corr}(i)$, i=1 to 5) in unit of dB from the five power measurement results received from the satellite payload as follows: $\Delta_{corr(i)} = P_{BCCH\_Measurement}(i) - P_{BCCH\_Nominal}$, where $P_{BCCH\_Measurement}(i)$ (i=1 to 5) represents the power measurement result from each of five frequency bins belong to the BCCH calibration carrier, and $P_{BCCH\_Nominal}$ represents the nominal power level of the 31.25 kHz BCCH calibration carrier at input of the satellite Ka-band antenna.

Based on BCCH calibration signal frequency response H(f), the relation between the expected power level of each of five frequency bins ($P_{BCCH\_bin}(i)$, i=1 to 5) and the nominal power level of the 31.25 kHz BCCH calibration carrier $P_{BCCH\_Nominal}$ is:

$$\frac{P_{BCCH\_bin}(i)}{P_{Nominal}} = \frac{\int_{f_{start}(i)}^{f_{end}(i)} |H(f)|^2 df}{\int_{f_{carrier\_start}}^{f_{carrier\_end}} |H(f)|^2 df} \qquad (3)$$

Where $f_{start}(i) = f_i - 3.125$ kHz and $f_{end}(i) = f_i + 3.125$ kHz. $f_i$ is the center frequency of frequency bin i (i=1 to 5); $f_{carrier\_start} = f_{CMW} - 15.625$ kHz and $f_{carrier\_end} = f_{CMW} + 15.625$ kHz. $f_{CMW}$ is the center frequency of the 31.25 kHz BCCH calibration carrier. Using equation (3), the expected power level of each of five frequency bins ($P_{BCCH\_bin}(i)$, i=1 to 5) is derived from $P_{BCCH\_Nominal}$ as:

$$P_{BCCH\_bin}(1) = P_{BCCH\_Nominal} - 9.9 \text{ dB}$$

$$P_{BCCH\_bin}(2) = P_{BCCH\_Nominal} - 5.78 \text{ dB}$$

$$P_{BCCH\_bin}(3) = P_{BCCH\_Nominal} - 5.73 \text{ dB}$$

$$P_{BCCH\_bin}(4) = P_{BCCH\_Nominal} - 5.78 \text{ dB}$$

$$P_{BCCH\_bin}(5) = P_{BCCH\_Nominal} - 9.9 \text{ dB} \qquad (4)$$

And the expected power correction factors $\Delta_{expected\_corr}(i)$ (i=1 to 5) are:

$$\Delta_{expected\_corr}(1) = -9.9 \text{ dB}$$

$$\Delta_{expected\_corr}(2) = -5.78 \text{ dB}$$

$$\Delta_{expected\_corr}(3) = -5.73 \text{ dB}$$

$$\Delta_{expected\_corr}(4) = -5.78 \text{ dB}$$

$$\Delta_{expected\_corr}(5) = -9.9 \text{ dB} \qquad (5)$$

The Calibration Power Measurement Success Criteria may be as follows. The TCS receives the five power correction factors $\Delta_{corr}(i)$ (i=1 to 5) from the GRM and determines whether BCCH long loop calibration process is succeeded or failed. The TCS may validate the five power correction factors $\Delta_{corr}(i)$ values (i=1 to 5) using equation (6).

$$\Delta_{corr\_diff}(i) = \Delta_{corr}(i) - \Delta_{expected\_corr}(i), \; i=1 \text{ to } 5 \qquad (6)$$

Where for the two edge bins (i=1 or 5), $\Delta_{corr\_diff}(i) \leq \pm \Delta_{corr\_max\_edge}$ and for the three center bins (i=2, 3 or 4), $\Delta_{corr\_diff}(i) \leq \pm \Delta_{corr\_max\_center}$.

When equation (6) is not satisfied, the TCS may discard these measurement results and wait for the next measurement. The $\Delta_{corr\_max\_edge}$ and $\Delta_{corr\_max\_center}$ may be configurable parameters on the EMS and may be both set to 5 dB initially. The final value of $\Delta_{corr\_max\_edge}$ and $\Delta_{corr\_max\_center}$ may be based on empirical data from the field testing. In some embodiments, when the TCS receives three consecutive invalid measurements, the BCCH calibration may be considered a failure.

The TCS may compute the power correction factor of the 31.25 kHz BCCH calibration carrier ($\Delta_{corr\_carrier}$) from the five power correction factors $\Delta_{corr}(i)$ received from the GRM per equation (7).

$$\Delta_{corr\_carrier} = 10 \times \log_{10}\left(\sum_{i=1}^{5} 10^{\frac{\Delta_{corr}(i)}{10}}\right) \qquad (7)$$

In some embodiments, when $\Delta_{corr\_carrier}$ is within $\pm \Delta_{corr\_min}$ dB, the BCCH calibration may be considered successful. The $\Delta_{corr\_min}$ is set to 0.3 dB. The TCS generates the corrected BCCH transmit power level ($P_{BCCH\_corrected}$) used for control channel transmission after the BCCH long loop calibration as: $P_{BCCH\_corrected} = P_{BCCH\_SB2}(f_{BCCH\_SB2}) - \Delta_{corr\_carrier}$.

In some embodiments, when $\Delta_{corr\_carrier}$ is more than $\pm \Delta_{corr\_max}$ dB, the BCCH calibration may be considered a failure. The $\Delta_{corr\_max}$ may be set to 5 dB initially. The final value of $\Delta_{corr\_max}$ may be based on empirical data from the field testing.

In some embodiments, when $\Delta_{corr\_carrier}$ is between $\Delta_{corr\_min}$ and $\Delta_{corr\_max}$, or between $-\Delta_{corr\_min}$ and $-\Delta_{corr\_max}$, the next CMW signal transmit power level $P_{BCCH\_SB2}(f_{BCCH\_SB2})$ may be adjusted by $\Delta_{corr\_carrier}$ as equation (8).

$$P_{BCCH\_SB2}(f_{BCCH\_SB2}) = P_{BCCH\_SB2}(f_{BCCH\_SB2}) + \Delta_{corr\_carrier} \quad (8)$$

Long Loop Calibration

In some embodiments, long loop calibration may be a closed-loop calibration of the BCCH carrier's transmit power level at the Ka-band input antenna on the satellite. The power measurement point may be at the payload in the satellite. In some embodiments, a long loop calibration may include a step to select an ERFN for calibration. SLC may have been performed in the selected ERFN and the selected ERFN may not require a SLC. The long loop calibration may include a step to setup a reference CMW burst on the selected ERFN for a selected sub-band frequency. The long loop calibration may include a step to measure calibration signal power at the satellite.

In some embodiments, the present teachings calculate the BCCH calibration correction factors of five frequency bins of the BCCH carrier as a power difference between the target power at the satellite and the measured power of the reference BCCH bursts. In some embodiments, the long loop calibration may include a step to un-route the BCCH from the old sub-band (SB1) in use and route the BCCH to the new sub-band (SB2). As such, the BCCH may be transmitted on SB2 and broadcast to the beam. Traffic, including voice calls, may be routed/transferred from SB1 to SB2.

A gateway or TCS may schedule a BCCH calibration for each BCCH sub-band. The calibration may be based time that has elapsed since a last calibration and a maximum time interval between calibrations. The calibration may be performed by a manual initiation from an operator. The calibration may be performed at startup.

In an exemplary calibration, assuming that BCCH1 on SB1 (Sub-band 1 in Ka-band) is being routed to FS1 (L-band), and BCCH1 currently being transmitted by CU port 1. Let's also assume that the TCS selects CU port 2 to take over the BCCH1 after calibration is completed. The TCS requests a BCCH calibration sub-band allocation from the GRM for calibration. Upon receiving the sub-band allocation request from the TCS, the GRM determines whether a sub-band can be allocated to the TCS. If a sub-band is available, call it SB2 (Sub-band 2), the GRM passes the SB2 information to the TCS.

The TCS activates the BCCH calibration at a power level. Initially the BCCH calibration power may be determined by Equation (1). The CU port 2 starts to transmit the calibration signal back-to-back every frame in SB2 without interfering with the BCCH or traffic on SB1/FS1. After sending the BCCH Calibration Sub-band Allocation response message to the TCS, a power measurement is performed on the exemplary five 6.25 kHz frequency bins within the 31.25 kHz BCCH calibration carrier on the satellite.

The TCS receives the power measurement results. The power measurement data may be used along with the link budget for a nominal BCCH power level at input of the satellite Ka-band antenna. The TCS validates the power correction factors using Equation 6. The TCS then computes the delta power correction factor of the BCCH calibration carrier based on the five power correction factors received from the GRM using Equation 7

If the delta power correction factor is within a value of $\pm\Delta_{corr\_min}$, the calibration is considered successful. If the delta power correction factor is more than $\pm\Delta_{corr\_max}$, the TCS may generate an alarm, may take CU port 2 out of service, may send a Calibration Sub-band Deallocation request to a GRM, and may start the calibration with another port.

If the delta power correction factor is between $\Delta_{corr\_min}$ and $\Delta_{corr\_max}$, or between $-\Delta_{corr\_min}$ and $-\Delta_{corr\_max}$, the delta power correction factor is applied to the BCCH calibration signal power level. The TCS may update CU port 2 with the updated calibration power level to adjust the transmit level accordingly.

When the TCS has the required level adjustment for SB2 on CU port2, the transmission of the BCCH calibration signal is discontinued. The TCS sends the Calibration Sub-band Transition request message to the GRM to start un-routing the SB1/FS1 pair and routing SB2/FS1 pair process on the satellite. The TCS may move any voice calls existing on SB1 to SB2.

Figure 3:
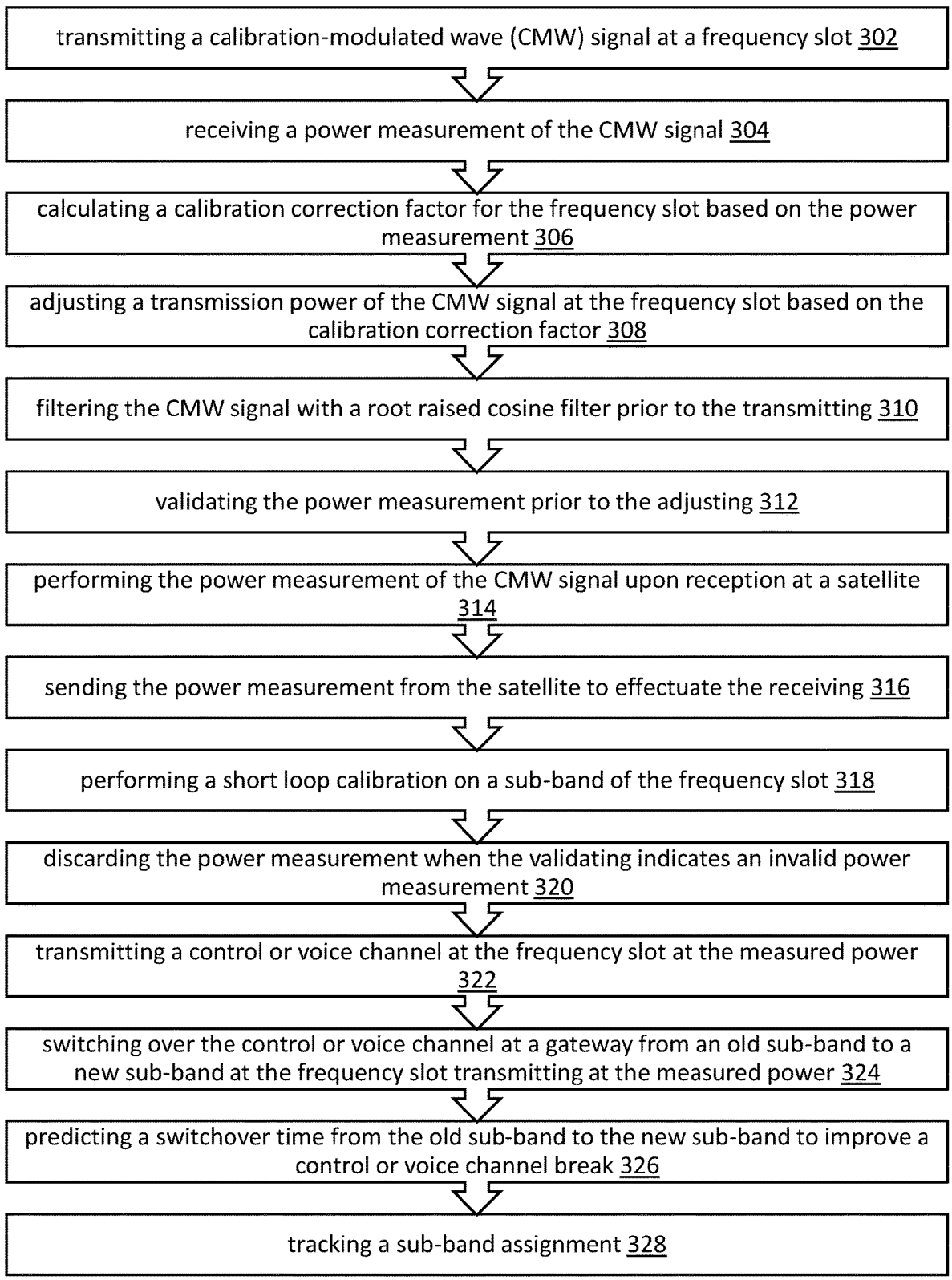
FIG. 3 is a flowchart of a method for setting a calibration signal power, according to various embodiments.

FIG. 3 is a flowchart of a method for setting a calibration signal power, according to various embodiments.

A method 300 for setting a calibration signal power may include transmitting a calibration-modulated wave (CMW) signal at a frequency slot at operation 302. The method 300 may include receiving a power measurement of the CMW signal at operation 304. The method 300 may include calculating a calibration correction factor for the frequency slot based on the power measurement at operation 306. The method 300 may include adjusting a transmission power of the CMW signal at the frequency slot based on the calibration correction factor at operation 308.

The method 300 may include filtering the CMW signal with a root raised cosine filter prior to the transmitting at operation 310. The method 300 may include validating the measurement prior to the adjusting at operation 312. The method 300 may include performing the power measurement of the CMW signal upon reception at a satellite at operation 314. The method 300 may include sending the power measurement from the satellite to effectuate the receiving at operation 316. The method 300 may include performing a short loop calibration on a sub-band of the frequency slot at operation 318. The method 300 may include discarding the power measurements when the validating indicates an invalid power measurement at operation 320. The method 300 may include transmitting a control or voice channel at the frequency slot at the measured power at operation 322. The method 300 may include switching over the control or voice channel at a gateway from an old sub-band to a new sub-band at the frequency slot transmitting at the measured power at operation 324. The method 300 may include predicting a switchover time from the first link to the second link to improve a control or voice channel break at operation 326. The method 300 may include tracking a sub-band assignment at operation 328.

Acronym List

| Acronym | Definition |
| --- | --- |
| BCCH | Broadcast Common Control Channel |
| CMW | Calibration-Modulated Wave |
| CU | Channel Unit |
| dB | decibel |
| ERFN | Ethernet Radio Frequency Node |
| FS | Frequency Slot |
| GRM | Global Resource Management |
| IDS | IF Distribution Subsystem |
| IF | Intermediate Frequency |
| PCS | Payload Control Subsystem |
| RFT | Radio Frequency Terminal |
| SB | Sub-Band |
| SLC | Short Loop Calibration |

-continued

| Acronym | Definition |
| --- | --- |
| TCS | Traffic Control Subsystem |
| UT | User Terminal |

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for setting a calibration signal power, the method comprising:
 transmitting a calibration-modulated wave (CMW) signal at a frequency slot;
 receiving a power measurement of the CMW signal;
 calculating a calibration correction factor for the frequency slot based on the power measurement; and
 adjusting a transmission power of the CMW signal at the frequency slot based on the calibration correction factor.

2. The method of claim 1, further comprising filtering the CMW signal with a root raised cosine filter prior to the transmitting.

3. The method of claim 1, further comprising validating the power measurement prior to the adjusting.

4. The method of claim 1, wherein the receiving comprises receiving the power measurement from a satellite.

5. The method of claim 1, further comprising performing the power measurement of the CMW signal upon reception at a satellite; and sending the power measurement from the satellite to effectuate the receiving.

6. The method of claim 1, wherein the calculating of the calibration correction factor is based on a power difference between a target power and the power measurement of the frequency slot.

7. The method of claim 1, further comprising performing a short loop calibration on a sub-band of the frequency slot.

8. The method of claim 1, wherein the frequency slot comprises frequency bins and the power measurement comprises power measurements for each of the frequency bins.

9. The method of claim 8, wherein the calculating comprises calculating a respective calibration correction factor for each of the frequency bins as a power difference between a target power and a respective measured power of a respective frequency bin.

10. The method of claim 9, wherein, for each of the frequency bins, the adjusting adjusts a respective transmission power based on a respective calibration correction factor.

11. The method of claim 8, further comprising validating, for each of the frequency bins, a power correction factor prior to the calculating of a respective power correction factor for a respective frequency bin.

12. The method of claim 11, further comprising discarding the power measurements when the validating of a respective power measurement for any of the frequency bins indicates an invalid power measurement.

13. The method of claim 1, further comprising transmitting a control or voice channel at the frequency slot at the transmission power; and switching over the control or voice channel at a gateway from an old sub-band to a new sub-band at the frequency slot transmitting at the measured power.

14. The method of claim 13, further comprising predicting a switchover time from the old sub-band to the new sub-band to improve a control or voice channel break.

15. The method of claim 13, further comprising tracking the sub-band assignment, wherein the switching over switches back to the old sub-band when a switchover to the new sub-band fails.

16. The method of claim 1, wherein the CMW signal is a continuous signal.

17. The method of claim 1, wherein the CMW signal is used for setting the transmission power for a Broadcast Common Control Channel.

18. A system to set a calibration signal power, the system comprising:
 a root raised cosine filter to filter a CMW signal;
 a transmitter to transmit a calibration-modulated wave (CMW) at a frequency slot comprising frequency bins;
 a receiver to receive a power measurement of the CMW signal;
 at least one processor configured to execute a Global Resource Management (GRM) module to calculate a calibration correction factor for each of the frequency bins of the frequency slot based on the power measurement received at the receiver; and
 the at least one processor further configured to execute a Traffic Control Subsystem (TCS) module to adjust a transmission power of the CMW signal at a channel unit at each of the frequency bins of the frequency slot based on a respective calibration correction factor calculated at the GRM,
 wherein the CMW signal is used for setting a transmission power for a Broadcast Common Control Channel.

19. The system of claim 18, further comprising a satellite to perform a respective power measurement of each of the frequency bins of the CMW signal at the satellite upon reception, and to send each of the respective power measurements as the power measurement to the receiver.

20. The system of claim 18, wherein the GRM calculates the calibration correction factor based on a power difference between a respective target power and a respective power measurement of each of the frequency bins of the frequency slot.

* * * * *